(12) United States Patent
Sugeno et al.

(10) Patent No.: US 11,594,903 B2
(45) Date of Patent: Feb. 28, 2023

(54) POWER STORAGE SYSTEM AND CONTAINER TYPE POWER STORAGE SYSTEM

(71) Applicant: MURATA MANUFACTURING CO., LTD., Kyoto (JP)

(72) Inventors: Naoyuki Sugeno, Kyoto (JP); Koji Umetsu, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 421 days.

(21) Appl. No.: 16/797,976

(22) Filed: Feb. 21, 2020

(65) Prior Publication Data

US 2020/0195027 A1 Jun. 18, 2020

Related U.S. Application Data

(63) Continuation of application No. PCT/JP2018/031519, filed on Aug. 27, 2018.

(30) Foreign Application Priority Data

Aug. 29, 2017 (JP) .............................. JP2017-164524

(51) Int. Cl.
H02J 7/00 (2006.01)
H01M 10/42 (2006.01)

(52) U.S. Cl.
CPC ......... *H02J 7/0045* (2013.01); *H01M 10/425* (2013.01); *H02J 7/0042* (2013.01); *H02J 7/0016* (2013.01)

(58) Field of Classification Search
CPC ...... H02J 7/0042; H02J 7/0045; H02J 7/0016; H01M 10/425

(Continued)

(56) References Cited

U.S. PATENT DOCUMENTS 8,947,882 B2 * 2/2015 Kim .................... H01H 19/585
361/728
2004/0223301 A1 * 11/2004 Muller .................. H02M 7/003
361/699

(Continued)

FOREIGN PATENT DOCUMENTS

JP S58145006 U 9/1983
JP H06165310 A 6/1994

(Continued)

OTHER PUBLICATIONS

International Search Report for Application No. PCT/JP2018/031519, dated Nov. 20, 2018.

(Continued)

*Primary Examiner* — Edward Tso
*Assistant Examiner* — Aaron Piggush
(74) *Attorney, Agent, or Firm* — K&L Gates LLP (57) ABSTRACT

A power storage system of the present technology includes a battery board configured to accommodate a secondary battery, a branch board, a first frame on which the battery board is placed, a second frame on which the branch board is placed, and a plurality of connection wirings that are disposed in the first frame and the second frame and connects the battery board and the branch board. The plurality of connection wirings are aggregated in the second frame.

13 Claims, 10 Drawing Sheets

(58) Field of Classification Search
USPC .................................... 320/107, 113; 429/7
See application file for complete search history.

(56) References Cited

U.S. PATENT DOCUMENTS

| | | | |
|---|---|---|---|
| 2014/0117762 A1 | 5/2014 | Yamauchi et al. | |
| 2016/0149177 A1* | 5/2016 | Sugeno | H01G 11/10 |
| | | | 429/151 |
| 2016/0347183 A1 | 12/2016 | Kusumi et al. | |
| 2017/0279301 A1* | 9/2017 | Iwatsuki | G06F 1/30 |
| 2017/0301907 A1* | 10/2017 | Park | H05K 1/181 |

FOREIGN PATENT DOCUMENTS

| | | |
|---|---|---|
| JP | 2015125979 A | 7/2015 |
| JP | 2016219283 A | 12/2016 |
| JP | 2016220475 A | 12/2016 |
| JP | 2017098374 A | 6/2017 |
| WO | 2012176261 A1 | 12/2012 |
| WO | 2016072041 A1 | 5/2016 |
| WO | 2016/068318 | 6/2016 |

OTHER PUBLICATIONS

European Search Report dated Apr. 21, 2021 in corresponding European Application No. 18851335.2.
Chinese Office Action dated Dec. 23, 2021 in corresponding Chinese Application No. 201880056631.1.
Chinese Office Action dated Aug. 3, 2022 in corresponding Chinese Application No. 201880056631.1.

* cited by examiner

[Table 1]

| Cable specification | | | In-DC board and battery board terminal part processing length | | Battery Board No. (number) | | | | | | | | |
|---|---|---|---|---|---|---|---|---|---|---|---|---|---|
| MLFC 1 rod | Ω/km | Ω/m | | Length adjustment mm | 1 | 2 | 3 | 4 | 5 | 6 | 7 | 8 | 9 |
| | | | Length of wire rod (mm) - Board width dimension | | 800 | 800 | 800 | 800 | 800 | 800 | 800 | 800 | 800 |
| | | Wiring in DC board | 22sq adopted | Length adjustment mm | 1850 | 1400 | 1450 | 1150 | 850 | 1300 | 1100 | 950 | 800 |
| 22sq | 0.844 | 0.000844 | | Resistance value (Ω) | 0.031228 | 0.023632 | 0.024476 | 0.019412 | 0.014348 | 0.0211944 | 0.018568 | 0.016036 | 0.013504 |
| 30sq | 0.625 | 0.000625 | Selection of wire rod types | 38sqx | 0.039164 | 0.039504 | | | | | | | |
| 38sq | 0.496 | 0.000496 | Total resistance value = inter-board resistance + in-DC board resistance (Ω) | 60sqx | | | 0.039404 | 0.039316 | 0.039228 | | | | |
| 50sq | 0.389 | 0.000389 | | | | | | | | | | | |
| 60sq | 0.311 | 0.000311 | | | | | | | | | | | |
| 80sq | 0.23 | 0.00023 | | 100sqx | | | | | | 0.039512 | 0.039064 | 0.03946 | 0.039856 |
| 100sq | 0.183 | 0.000183 | | | | | | | | | | | |

FIG. 10

[Table 2]

| Board No. | DC branch board ||| Wire rod: 1500 V MLFC, selection of nominal cross-sectional area and length |||||||||
|---|---|---|---|---|---|---|---|---|---|---|---|---|
| | In-board height from low to high | In-board height from low to high | In-board wiring 22 sq used | Battery Board No. (number) |||||||||
| | | Length used (m) | | 1 | 2 | 3 | 4 | 5 | 6 | 7 | 8 | 9 |
| | | | | 38 sq/60 sq/100 sq, three types |||||||||
| 1 | ⑨ | 1.85 | x2 | 38sq 0.8m x 2 | | | | | | | | |
| 2 | ⑦ | 1.4 | x2 | | 38sq 1.6m x 2 | | | | | | | |
| 3 | ⑧ | 1.45 | x2 | | | 60sq 2.4m x 2 | | | | | | |
| 4 | ⑤ | 1.15 | x2 | | | | 60sq 3.2m x 2 | | | | | |
| 5 | ② | 0.85 | x2 | | | | | 60sq 4.0m x 2 | | | | |
| 6 | ⑥ | 1.3 | x2 | | | | | 100sq 4.8m x 2 | | | | |
| 7 | ④ | 1.1 | x2 | | | | | | 100sq 5.6m x 2 | | | |
| 8 | ③ | 0.95 | x2 | | | | | | | 100sq 6.4m x 2 | | |
| 9 | ① | 0.8 | x2 | | | | | | | | | 100sq 7.2m x 2 |

POWER STORAGE SYSTEM AND CONTAINER TYPE POWER STORAGE SYSTEM

CROSS REFERENCE TO RELATED APPLICATIONS

The present application is a continuation of PCT patent application no. PCT/JP2018/031519, filed on Aug. 27, 2018, which claims priority to Japanese patent application no. JP2017-164524 filed on Aug. 29, 2017, the entire contents of which are being incorporated herein by reference.

BACKGROUND

The present technology relates to a power storage system and a container type power storage system. Specifically, the present technology relates to a power storage system and a container type power storage system that include a plurality of connection wirings that connects a battery board and a branch board.

Conventionally, in a power storage system in which a battery board housing a secondary battery such as a lithium ion battery, and a branch board such as a distribution board, are connected by a plurality of connection wirings, when the plurality of connection wirings is connected in parallel, resistance of the connection wirings may cause a difference in parallel impedance of each secondary battery in the battery board. When the difference in impedance is large, a larger amount of current flows through the secondary batteries with a small impedance, thus generating variation in remaining capacitances of the secondary batteries connected in parallel.

As a technology for reducing the difference in parallel impedance of each secondary battery, there is known a method of connection to a host device using wirings having an identical length for a parallel connection.

However, in the method of connection to a host device using wirings having an identical length as described above, it is necessary to connect the wirings of the number of parallel connections to the host device. In this case, a cable length between the battery board and the branch board needs to be adjusted to a length for the farthest distance therebetween. Here, even when the battery board and the branch board are disposed closest to each other, use of an unnecessarily long cable will require a space for storing the cable, deteriorate wiring work efficiency during construction, and increase material costs and work costs.

SUMMARY

The present technology relates to a power storage system and a container type power storage system. Specifically, the present technology relates to a power storage system and a container type power storage system that include a plurality of connection wirings that connects a battery board and a branch board.

Therefore, the present technology has been made in view of such a circumstance, and it is a main object of the present technology to provide a power storage system with improved installation work efficiency of a battery board.

According to an embodiment of the present technology, the present technology provides a power storage system including a battery board configured to accommodate a secondary battery, a branch board, a first frame on which the battery board is placed, a second frame on which the branch board is placed, and a plurality of connection wirings that are disposed in the first frame and the second frame and connects the battery board and the branch board, in which the plurality of connection wirings are aggregated in the second frame.

According to an embodiment of the present technology, the present technology provides a container type power storage system including a power storage device that includes a battery board configured to accommodate a secondary battery, a branch board, a first frame on which the battery board is placed, a second frame on which the branch board is placed, and a plurality of connection wirings that are disposed in the first frame and the second frame and connect the battery board and the branch board, in which the plurality of connection wirings is aggregated in the second frame, the power storage device configured to be accommodated in a container for outdoor use.

The present technology can provide a power storage system with improved installation work efficiency of a battery board. It should be understood that the effects described herein are not limited, but may be any of or different from the effects described in the present disclosure.

BRIEF DESCRIPTION OF FIGURES

FIGS. 4A and 4B are illustrating an arrangement example of a connection wiring connecting the battery board and the branch board illustrated in FIG. 2.

FIGS. 6A and 6B are enlarged views illustrating an arrangement example of the connection wiring connecting the battery board and the branch board illustrated in FIG. 5.

FIGS. 8A and 8B are schematic diagrams illustrating a configuration example of inside of the container type power storage system illustrated in FIG. 7.

DETAILED DESCRIPTION

As described herein, the present disclosure will be described based on examples with reference to the drawings, but the present disclosure is not to be considered limited to the examples, and various numerical values and materials in the examples are considered by way of example.

A power storage system according to a first embodiment of the present technology will be described with reference to FIGS. 1 to 6. In this embodiment, as an example, a power storage system using a battery module that houses a lithium ion rechargeable battery will be described.

Figure 1:
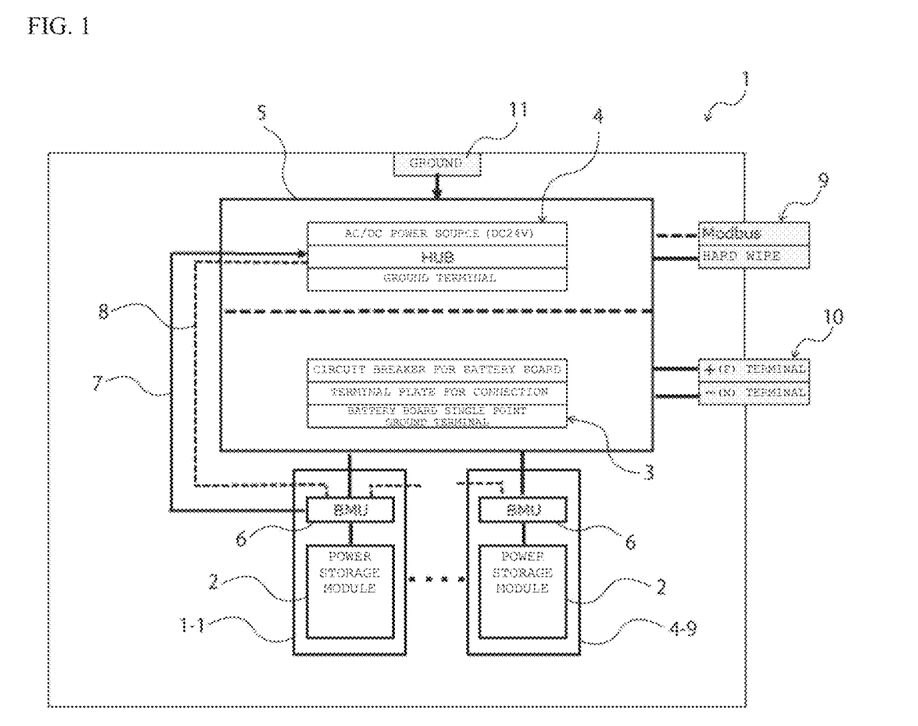
FIG. 1 is a block diagram illustrating a configuration example of a power storage system according to an embodiment of the present technology.

First, the overview of the power storage system according to this embodiment will be provided below. As illustrated in FIG. 1, the power storage system 1 according to this embodiment includes a plurality of battery boards 1-1 to 4-9 that has a battery module 2 housing a plurality of secondary batteries, and a branch board 5 having a circuit breaker storage unit 3 and an information collection unit 4. The plurality of battery boards 1-1 to 4-9 is connected in parallel to the circuit breaker storage unit 3 in the branch board 5.

Each of the battery boards 1-1 to 4-9 has a battery management unit (BMU) 6 that is electrically connected to the battery module 2. The BMUs 6 are connected to each other via a communication line. Among the battery boards 1-1 to 4-9 disposed at an end of the power storage system, the BMU 6 in the battery board 1-1 is connected to the HUB of the information collection unit 4 via a power auxiliary line 7 and a signal line 8. Further, power input and output lines from each BMU 6 are connected to an individual circuit breaker of the circuit breaker storage unit 3. Each of the battery boards 1-1 to 4-9 includes a battery module incorporating a rechargeable battery, and a controller that controls the battery module.

The circuit breaker storage unit 3 has, as an example, a battery board circuit breaker and a connection terminal board. The information collection unit 4 has, as an example, a commercial AC/DC power supply (DC24 V), the HUB, and a ground terminal. The HUB can collect information from each BMU 6. From the information collection unit 4, a communication signal and a contact signal of Modbus (e.g., RS485, TCP) are connected to the host device as a signal line 9.

Further, in the circuit breaker storage unit 3, the battery boards 1-1 to 4-9 and the circuit breakers are wired, and output sides of the circuit breakers are connected to each other to synthesize outputs. This synthesized DC power is electrically connected to the outside through an input and output terminal 10 having a positive (P) terminal and a negative (N) terminal. The branch board 5 is used for connection from the ground 11 to the earth ground.

The power storage system 1 is, as an example, a power storage system with a storage capacitance of 959 kWh×2, which is a total of 1,919 kWh. One set of power storage system of 959 kWh includes 18 battery boards and a branch board, and two sets include a total of 36 battery boards and two branch boards 5. Each branch board 5 is connected to two power conditioner systems (PCS) to supply power to the outside. The power storage system 1 according to this embodiment has a well devised way of connection between the battery boards 1-1 to 4-9 and the branch board 5.

Figure 2:
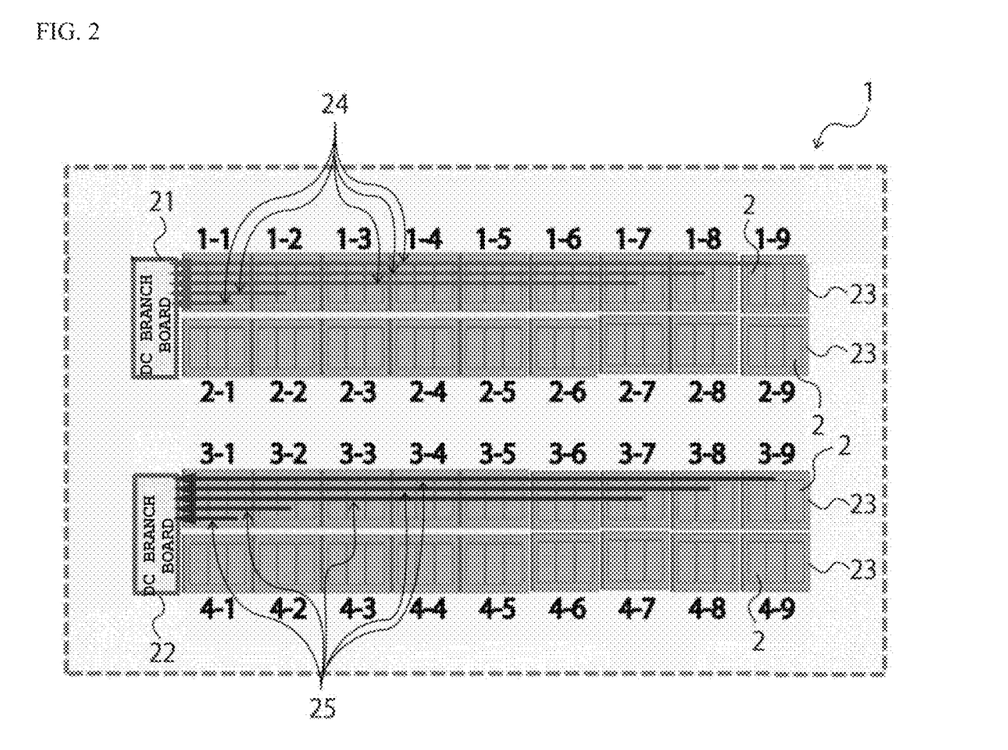
FIG. 2 is a plan view illustrating an arrangement example of a battery board and a branch board in the power storage system illustrated in FIG. 1.
Figure 3:
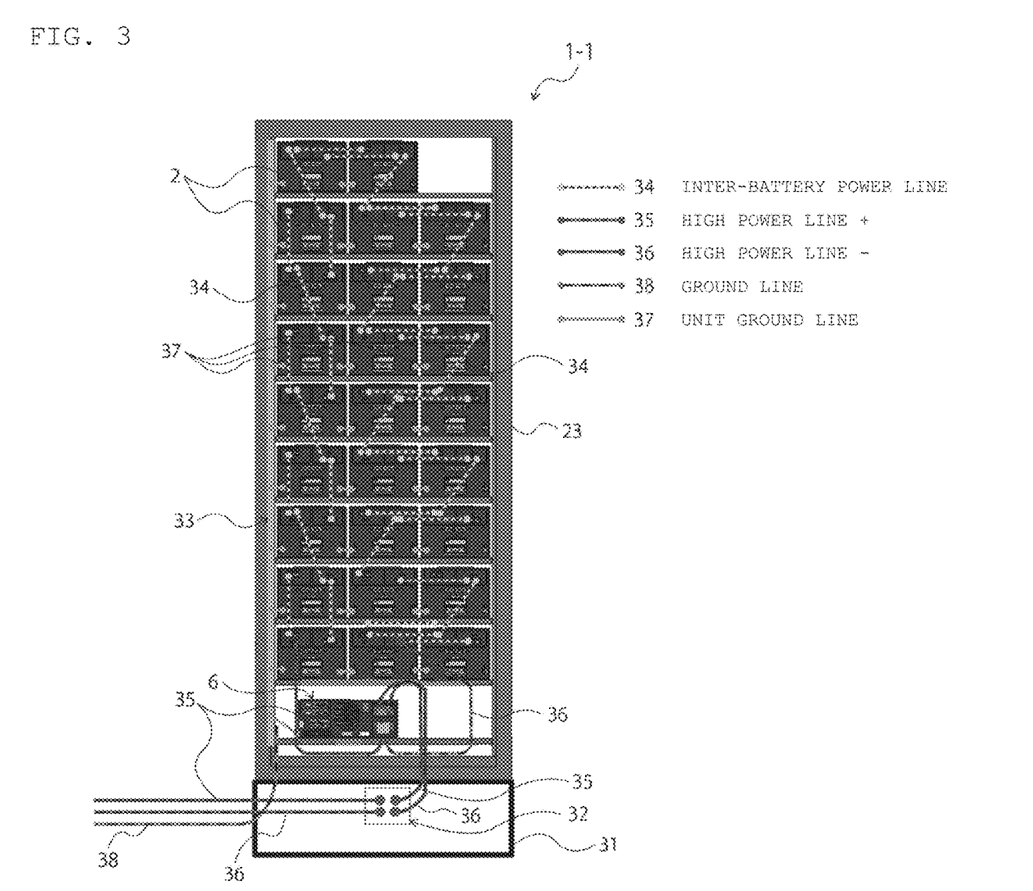
FIG. 3 is a side view illustrating a configuration example of inside of the battery board illustrated in FIG. 2.

An example of an arrangement of the battery board and the branch board according to this embodiment will be described with reference to FIGS. 2 to 6. FIG. 2 is a plan view illustrating an arrangement example of the battery board and the branch board in the power storage system according to this embodiment. FIG. 3 is a side view illustrating a configuration example of inside of the battery board according to this embodiment.

As illustrated in FIG. 2, in the power storage system 1 according to this embodiment, as an example, a branch board 21 is disposed at the left end at the top of the drawing, and nine battery boards 1-1 to 1-9 and nine battery boards 2-1 to 2-9 are arranged in parallel from the branch board 21 toward the right end. Similarly, in the power storage system 1 according to this embodiment, a branch board 22 is arranged at the left end at the bottom of the drawing, and nine battery boards 3-1 to 3-9 and nine battery boards 4-1 to 4-9 are arranged in parallel from the branch board 22 toward the right end. Each of the battery boards 1-1 to 4-9 is formed by housing a plurality of battery modules 2 in a battery rack 23.

As illustrated in FIG. 2, below the battery boards 1-1 to 1-9 and the branch board 21, a first frame and a second frame to be described later are installed. A connection wiring 24 that connects the battery boards 1-1 to 1-9 and the branch board 21 passes through the first frame to be aggregated in the second frame. The other battery boards and branch boards are similarly connected by the connection wiring. Note that the connection wiring 24 includes a two-pole connection wiring of a positive electrode and a negative electrode. The battery board and the branch board are also connected by a signal line that passes through the first frame and is aggregated in the second frame. In this way, the present technology constructs the wirings inside the frame on which the battery board and the branch board are placed.

As illustrated in FIG. 2, below the battery boards 3-1 to 3-9 and the branch board 21, a first frame and a second frame to be described later are also installed. A ground wire 25 that connects the battery boards 3-1 to 3-9 and the branch board 22 passes through the first frame to be aggregated in the second frame. The other battery boards and branch boards are similarly connected by the ground wire.

Next, a configuration example of inside of the battery board according to this embodiment will be described using the battery board 1-1. As illustrated in FIG. 3, the battery board 1-1 is placed on a frame 31. In the frame 31, a relay terminal 32 is provided to relay the connection between the battery board 1-1 and the branch board 21 and the like. The relay terminal 32 is used to enhance work efficiency of connecting the wirings. The relay terminal 32 also plays a role of connecting wirings having different diameters.

In the battery board 1-1, two rows of nine battery modules 2 vertically stacked are disposed, and further, a row of eight battery modules 2 vertically stacked is disposed in parallel. Among the total of 26 battery modules 2, two adjacent battery modules 2 are connected to each other in parallel via an inter-battery power line 34. The two battery modules 2 connected in parallel are considered as one set, and a total of 13 sets of the battery modules are connected in series via the inter-battery power line 34.

One end of each battery module 2 connected in series and the BMU 6 are connected by a positive high output line 35. The other end of each battery module 2 connected in series and the BMU 6 are connected by a negative high output line 36. The positive high output line 35 and the negative high output line 36 connect the BMU 6 and the upper branch board via the relay terminal 32.

On a left side surface inside the battery board 1-1, an in-board ground bus bar 33 is disposed extending vertically. The in-board ground bus bar 33 is connected to the adjacent battery modules 2 and the BMU 6 by unit ground lines 37. Further, the battery modules 2 laterally adjacent to each other are also connected by a unit ground line 37. The in-board ground bus bar 33 is connected to an external ground by a ground line 38.

The BMU 6 collects signal data of conditions such as the capacitance, voltage, current, and temperature of each battery module 2 and outputs the signal data to the HUB. Further, the BMU 6 includes a semiconductor element that blocks output power, and thus can safely protect the battery board 1-1 by blocking the output power.

Figure 4A:
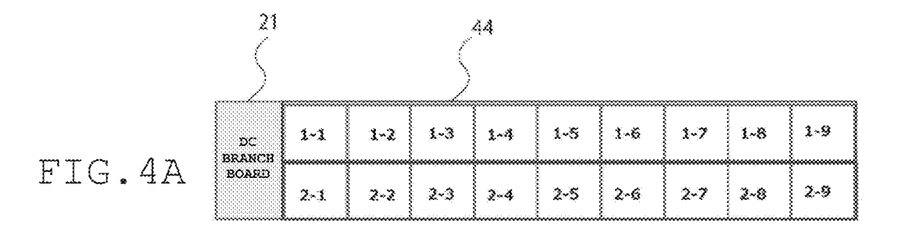
FIG. 4A is a plan view of the battery board and the branch board.
Figure 4B:
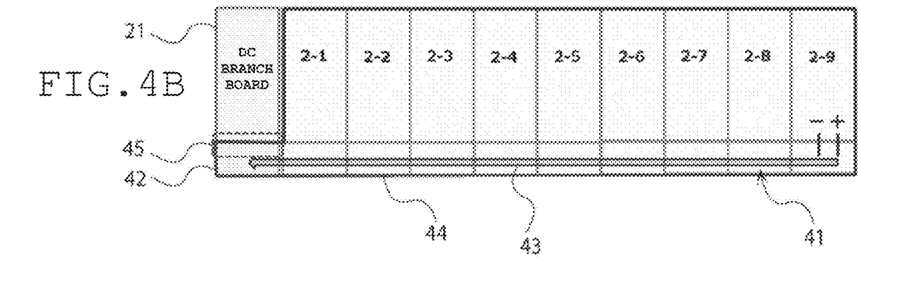
FIG. 4B is a side view of the battery board and the branch board.
Figure 5:
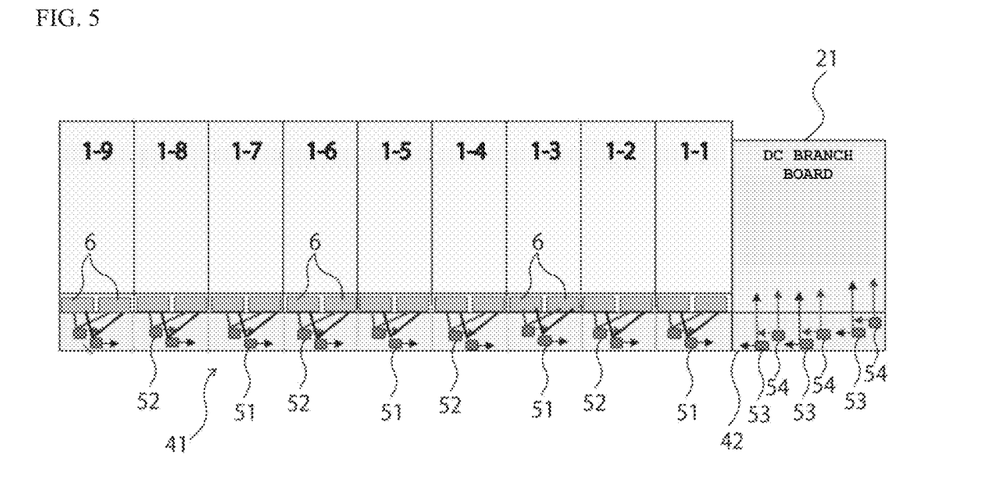
FIG. 5 is a diagram illustrating an arrangement example of a relay terminal in a frame on which the battery board and the branch board illustrated in FIG. 2 are placed.
Figure 6A:
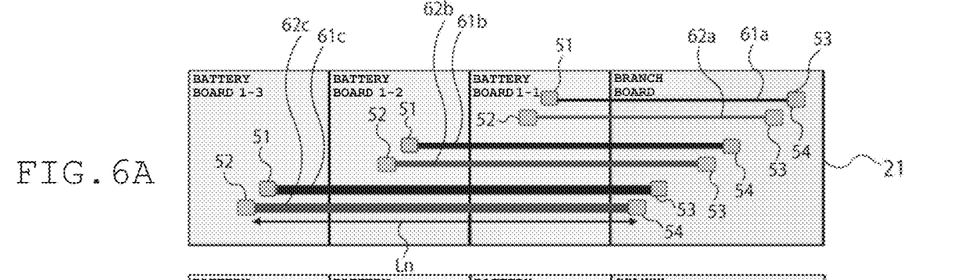
FIG. 6A is an enlarged plan view of the battery board and the branch board.
Figure 6B:
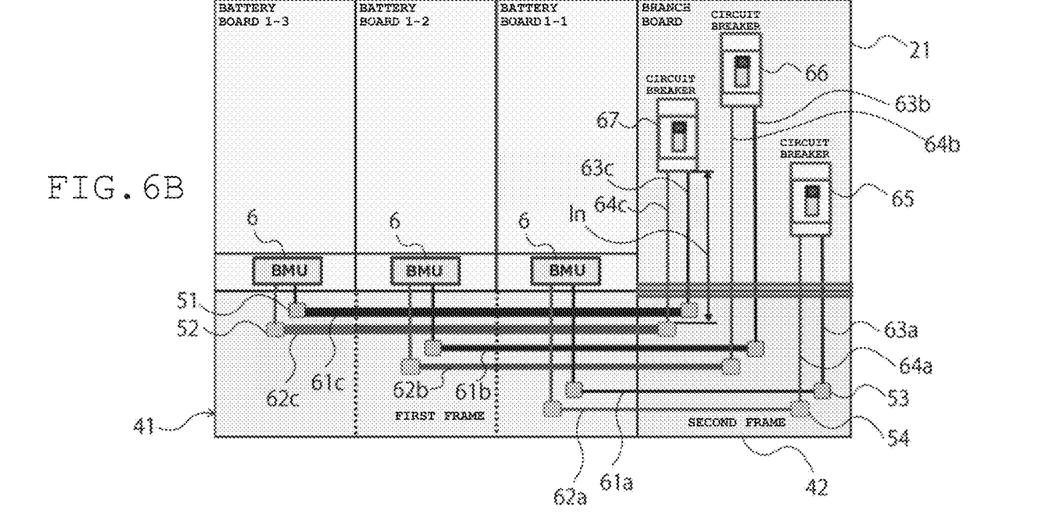
FIG. 6B is an enlarged side view of the battery board and the branch board.

An example of an arrangement of connection wirings for connecting the battery board and the branch board according to this embodiment will be described with reference to FIGS. 4 to 6. FIG. 4 is a diagram illustrating an arrangement example of connection wirings for connecting the battery board and the branch board according to this embodiment. FIG. 4A is a plan view of the battery board and the branch board, and FIG. 4B is a side view of the battery board and the branch board. FIG. 5 is a diagram illustrating an arrangement example of the relay terminals in the frame on which the battery board and the branch board according to this embodiment are placed. FIG. 6 is an enlarged view illustrating an arrangement example of connection wirings for connecting the battery board and the branch board according to this embodiment. FIG. 6A is an enlarged plan view of the battery board and the branch board, and FIG. 6B is an enlarged side view of the battery board and the branch board.

As illustrated in FIG. 4B, the battery boards 2-1 to 2-9 are placed on a first frame 41. Further, the branch board 21 is placed on a second frame 42. A connection wiring 43 that connects the battery boards 2-1 to 2-9 and the branch board 21 passes through the first frame 41 and is aggregated in the second frame 42. Note that the connection wiring 43 includes a positive wiring and a negative wiring. Further, as illustrated in FIGS. 4A and 4B, the battery boards 1-1 to 1-9, the battery boards 2-1 to 2-9, the first frame 41, and the second frame 42 are covered with a heat-resistant member having a high heat-resistance, for example, a case material of a metal plate 44. A connection part between the battery boards 2-1 to 2-9 and the branch board 21 has a shielding connection structure using the metal plate 44 and a through terminal. As a result, the battery boards 1-1 to 1-9 and the battery boards 2-1 to 2-9 are covered with the highly heat-resistant metal plate 44. This structure can prevent a fire that occurs inside the battery board from spreading outside the battery board. Further, this structure can prevent a fire that occurs outside the battery board from spreading inside the battery board.

An insulating member 45 is disposed between the branch board 21 and the second frame 42. As a result, all of the branch board 21 and the connection wiring 43 aggregated in the second frame 42 can be connected at one position. The insulating member 45 configured by an insulating material is, for example, a bake plate and a laminated plate made of glass and epoxy resin.

Here, in the conventional wiring method, in general, a wiring cable on a ceiling is drawn from each battery board and wired to the branch board, leaving the cable wiring exposed. In this wiring method, there is a risk that a safety problem may arise from a viewpoint of fire prevention, fire spread, and the like.

In contrast, in the power storage system 1 according to this embodiment, the battery boards 1-1 to 1-9, the battery boards 2-1 to 2-9, the first frame 41, and the second frame 42 together with a cable wiring part are all covered with a case member of the metal plate 44. This can further enhance safety compared with the conventional arrangement method.

Further, in the conventional technology, each battery board has a structure in which the wiring cable (power line or signal line) is drawn to the outside with an insulating member interposed therebetween. Therefore, when a plurality of battery boards is installed, an insulating member needs to be provided for each of the battery boards.

On the other hand, in the power storage system 1 according to this embodiment, the wiring is gathered at one position in the second frame 42 with the insulating member 45 interposed therebetween. This can greatly improve and enhance a manufacturing method, a manufacturing period, and installation work efficiency of the insulating member 45.

An impedance adjustment of the connection wiring according to this embodiment will be described with reference to FIGS. 5 and 6. FIG. 5 is a diagram illustrating an arrangement example of the relay terminals in the frame on which the battery board and the branch board according to this embodiment are placed. FIG. 6 is an enlarged view illustrating an arrangement example of the connection wiring connecting the battery board and the branch board illustrated in FIG. 5. FIG. 6A is an enlarged plan view of the battery board and the branch board, and FIG. 6B is an enlarged side view of the battery board and the branch board.

As illustrated in FIG. 5, a positive relay terminal 51 and a negative relay terminal 52 are installed below each of the battery boards 1-1 to 1-9, in the first frame 41. Further, as illustrated in FIG. 5, the number of positive relay terminals 53 and the number of negative relay terminals 54 which are installed in the second frame 42 respectively correspond to the number of positive relay terminals 51 and the number of negative relay terminals 52 of each of the battery boards 1-1 to 1-9. Each of the positive relay terminals 51 and the negative relay terminals 52 corresponds to a first relay terminal, and each of the positive relay terminals 53 and the negative relay terminals 54 corresponds to a second relay terminal.

As illustrated in FIG. 6A, the battery board 1-1 and the branch board 21 are connected by a positive connection wiring 61a between the relay terminals 51 and 53 and by a negative connection wiring 62a between the relay terminals 52 and 54. Similarly, the battery board 1-2 and the branch board 21 are connected by a positive connection wiring 61b between the relay terminals 51 and 53 and by a negative connection wiring 62b between the relay terminals 52 and 54. Similarly, the battery board 1-3 and the branch board 21 are connected by a positive connection wiring 61c between the relay terminals 51 and 53 and by a negative connection wiring 62c between the relay terminals 52 and 54. Here, a length of the connection wiring between the relay terminals is $L_n$(m).

Next, as illustrated in FIG. 6B, circuit breakers 65 to 67 of a number corresponding to the number of battery boards 1-1 to 1-3 are disposed in the branch board 21. The BMU 6 of the battery board 1-1 is first connected to the relay terminals 51 and 52 below the BMU, connected to the corresponding relay terminals 53 and 54 from the relay terminals 51 and 52 via the connection wirings 61a and 62a, and connected to the circuit breaker 65 from the relay terminals 53 and 54 via a positive internal connection wiring 63a and a negative internal connection wiring 64a. Similarly, the BMU 6 of the battery board 1-2 is first connected to the relay terminals 51 and 52 below the BMU, connected to the corresponding relay terminals 53 and 54 from the relay terminals 51 and 52 via the connection wirings 61b and 62b, and connected to the circuit breaker 66 from the relay terminals 53 and 54 via a positive internal connection wiring 63b and a negative internal connection wiring 64b. Similarly, the BMU 6 of the battery board 1-3 is first connected to the relay terminals 51 and 52 below the BMU, connected to the corresponding relay terminals 53 and 54 from the relay terminals 51 and 52 via the connection wirings 61c and 62c, and connected to the circuit breaker 67 from the relay terminals 53 and 54 via a positive internal connection wiring 63c and a negative internal connection wiring 64c. Here, a length of the internal connection wiring between the second relay terminal and the circuit breaker is $l_n$(m).

Here, in FIG. 6B, a wiring method between the branch board 21 and the battery boards 1-1 to 1-3 needs to be devised such that a current flowing through each battery board does not vary due to a difference in a conductor resistance of the wiring cable. In general, there is a method of using an identical wire rod or a cable of an identical length. However, in this embodiment, considering minimization of an amount of cable to be used, and a space for wiring, an optimal wiring method is proposed by selecting a cable thickness.

Specifically, the connection wirings 61 and 62 can be set such that a resistance value varies depending on a distance between the battery boards 1-1 to 1-3 and the branch board 21. The resistance value is preferably set so as to increase as the distance between the battery boards 1-1 to 1-3 and the branch board 21 decreases. Further, the connection wirings 61 and 62 can be set such that a cross-sectional area of a conductor varies depending on the distance between the battery boards 1-1 to 1-3 and the branch board 21. The cross-sectional area of the conductor is preferably set so as to decrease as the distance between the battery boards 1-1 to 1-3 and the branch board 21 decreases.

Meanwhile, a length of the internal connection wirings 63 and 64 can be set so as to be adjustable based on the length $L_n$ of the connection wirings 61 and 62 between the battery boards 1-1 to 1-3 and the branch board 21. Specifically, in the internal connection wirings 63 and 64, the length $l_n$ can be calculated using the following equation 1 from the length $L_n$ of the connection wirings 61 and 62 and a resistance value $R_n$ per unit length of the connection wirings 61 and 62.

$$(L_n \times R_n) + (l_n \times r_n) = Z \quad [\text{Equation 1}]$$

where n represents a number of the battery board, $L_n$ represents the length of the connection wiring, $R_n$ represents the resistance value per unit length of the connection wiring, $l_n$ represents the length of the internal connection wiring, $r_n$ represents the resistance value per unit length of the internal connection wiring, and Z represents a combined resistance value (constant) of the connection wiring and the internal connection wiring.

Here, a variation in a current value (amount of change in current) of each battery board will change an amount of power consumed by each battery board, resulting in a variation in consumption of a capacitance of each battery board. When the capacity variation occurs in the battery boards, the battery boards are discharged in parallel, resulting in the capacitance variation at the end of the discharge. When the capacitance reaches zero for the first time, the overall discharge stops, and the discharge time is shortened.

Further, charging is performed with the capacitance variation, and the capacitance variation occurs even for 100% charge at the end of the charge. In the battery boards in which the current variation occurs, when the current amount of one battery board is smaller than the current amount of the other battery boards, the discharge time of the one battery board becomes longer than the discharge time of the other battery boards. In charging in this state, the charging time varies among the battery boards even during the time of 100% full charge, resulting in a difference in charging capacitance.

In contrast, the power storage system 1 according to this embodiment uses the connection wirings 61 and 62 having different conductor resistance values depending on the distance between the battery boards 1-1 to 1-3 and the branch board 21 to equalize the conductor resistance value (match the values to an identical resistance value) between the battery boards 1-1 to 1-3 and the branch board 21. Thus, the variation (change amount) in the value of current flowing through the battery boards 1-1 to 1-3 can be minimized. Further, this technique of equalization can minimize the material to be used and the wiring space, improve the material cost and work efficiency, and then improve the work cost. In addition, in the power storage system 1 according to this embodiment, the impedance can be adjusted more accurately by adjusting the length $l_n$ of the internal connection wirings 63 and 64. Therefore, the variation (change amount) in the value of the current flowing through the battery boards 1-1 to 1-3 can be further minimized.

Further, for example, in the technology of Patent Document 1, when a circuit breaker is provided in each battery board, the circuit breaker needs to be installed inside the battery board, requiring a space for storing the circuit breaker. This may affect a size of the battery board and installation work efficiency of the battery board, cause a temperature rise in the battery board due to heat generated from the secondary battery, or affect reliability of the circuit breaker due to gas generated from the secondary battery with occurrence of abnormality. On the other hand, in the power storage system 1 according to this embodiment, the reliability and installation work efficiency can be enhanced by separating the battery board and the circuit breaker storage unit with the above configuration.

Figure 9:
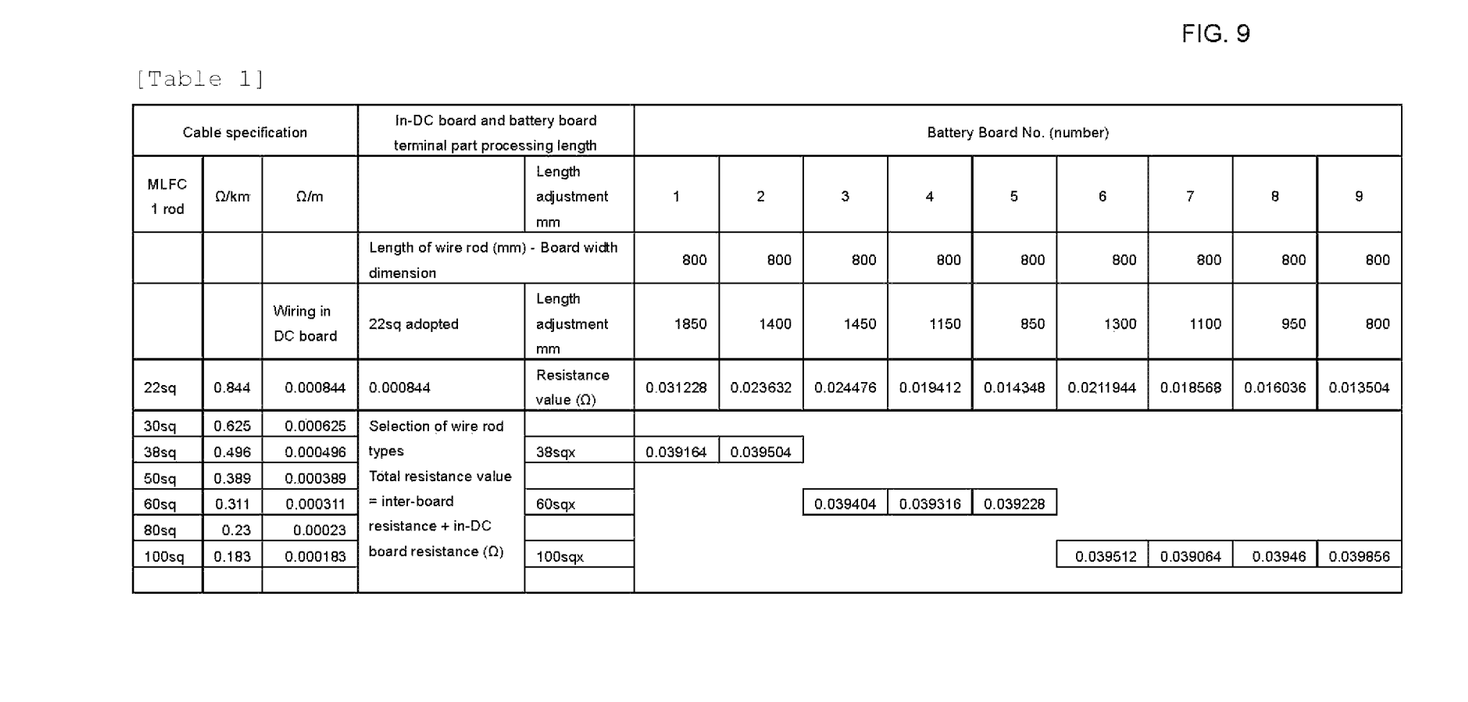
FIG. 9 is an illustration of Table 1.
Figure 10:
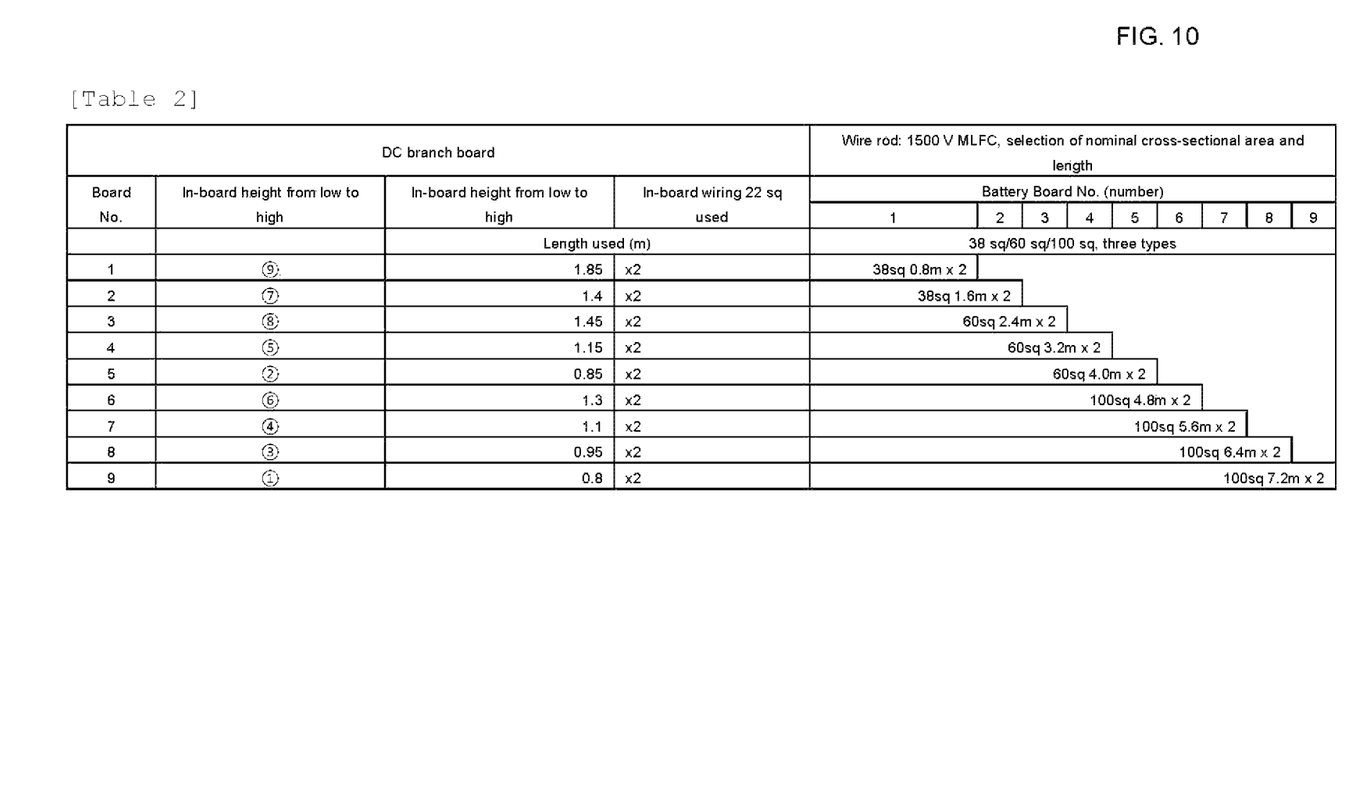
FIG. 10 is an illustration of Table 2.

Next, with reference to Tables 1 and 2 as shown in FIGS. 9 and 10, an example of suitable length adjustment of the connection wirings 61 and 62 and the internal connection wirings 63 and 64 of the power storage system 1 will be described.

In this example, a flame-retardant polyflex insulated wire (1500 V, MLFC) is used as an electric wire cable (connection wiring) between the battery board and the branch board. Table 1 shows results of determining, using the wire rod, optimum values of a type (thickness) and a length of the wire rod. In Table 1, "length adjustment" in processing length of the branch board and battery board terminal part represents that the length is adjusted in the branch board. For example, for battery boards No. 1 and 2, the circuit breaker is disposed in an upper part of the branch board to lengthen the cable processing, and for battery board No. 9, the circuit breaker is disposed closer to a bottom of the branch board to shorten the cable length. By adjusting the length as described above, a suitable length of the wire rod is calculated.

Table 2 represents suitable wire rod lengths calculated based on the results of Table 1. This represents that the branch board and the battery boards are preferably wired by selecting the type and the length of the wire rod as in Table 2. In Table 2, "×2" indicates that two wire rods are required, i.e., a positive electrode wire rod and a negative electrode wire rod.

A container type power storage system according to a second embodiment of the present technology includes a power storage device including a battery board that houses a secondary battery of the present technology, a branch board, a first frame on which the battery board is placed, a second frame on which the branch board is placed, and a plurality of connection wirings that is disposed in the first frame and the second frame and connects the battery board and the branch board, in which the plurality of connection wirings is aggregated in the second frame, the power storage device being housed in a container. The container type power storage system according to this embodiment can improve the installation work efficiency of the battery board, similarly to the power storage system according to the first embodiment of the present technology.

Figure 7:
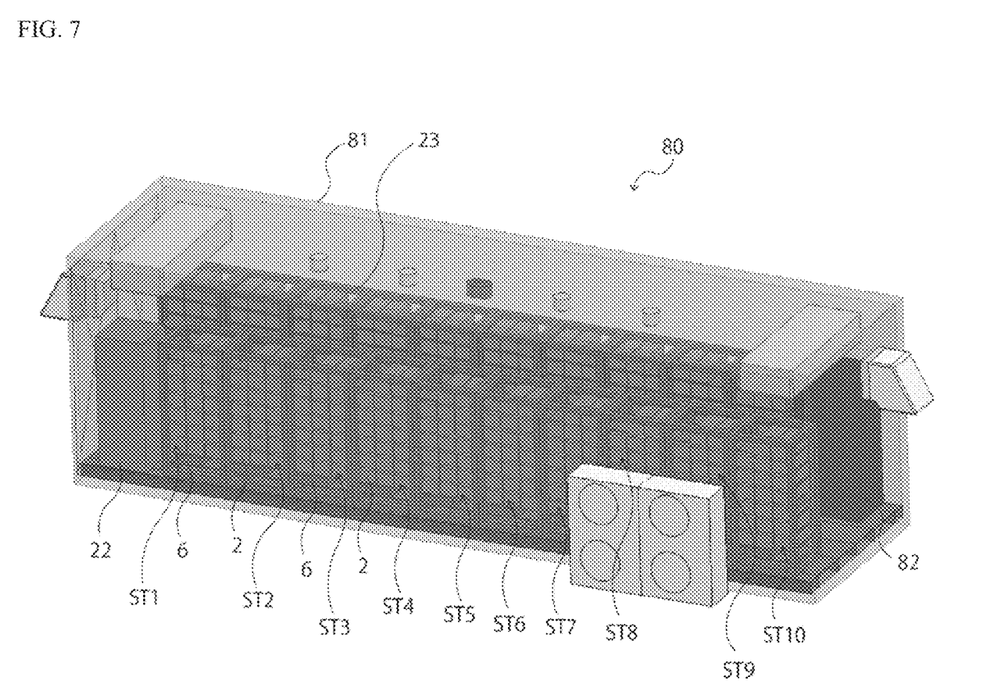
FIG. 7 is a perspective view illustrating a configuration example of a container type power storage system according to an embodiment of the present technology.
Figure 8A:
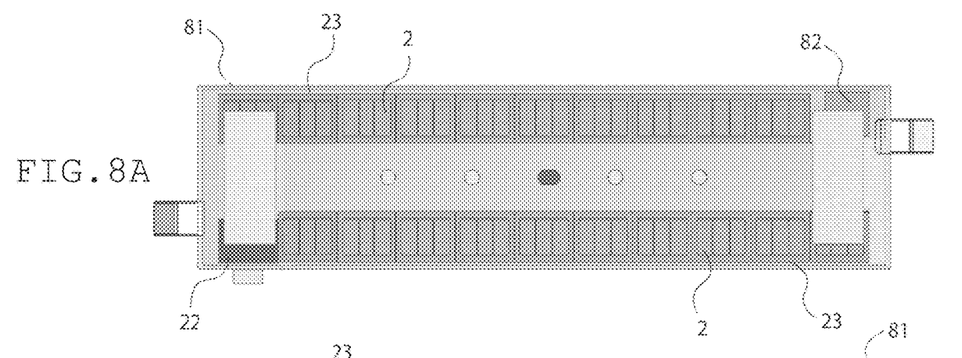
FIG. 8A is a plan view of the container type power storage system.

Hereinafter, an example of a container type power storage system 80 according to this embodiment will be described with reference to FIGS. 7 and 8. FIG. 7 is a schematic diagram illustrating an internal configuration of the container type power storage system 80 in a perspective view. FIG. 8A is a top view of the container type power storage system 80 of FIG. 7, and FIG. 8B is a side view of the container type power storage system 80 of FIG. 7.

Figure 8B:
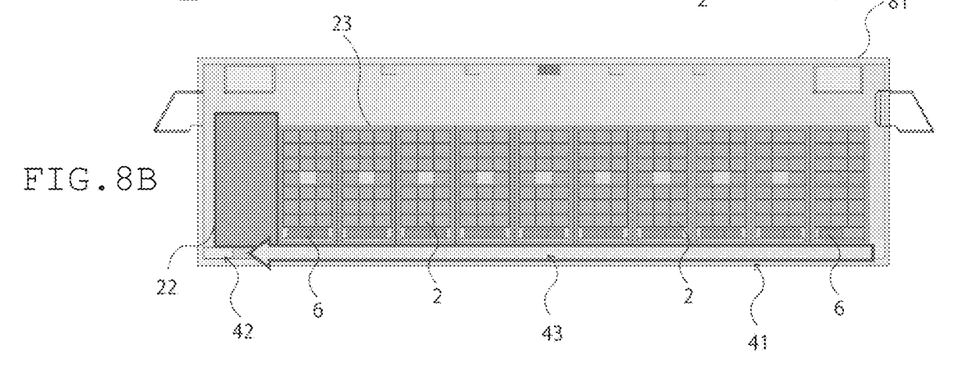
FIG. 8B is a side view of the container type power storage system.

As illustrated in FIGS. 7 and 8, the container type power storage system 80 is mounted with a container 81 that is modified from a transport container for power storage, a DC input and output board, strings ST1 to ST20, and 20 battery boards. Each battery board is mounted with the BMU 6 and the battery module 2.

The container 81 is, as an example, a metal box having a length of 40 feet. In the container type power storage system 80, a passage longitudinally extending and having such a width that allows a person to walk in a center of the passage in a width direction is formed. Further, a wiring duct is provided in a floor structure part of the container 81, and a DC power wiring and a communication wiring are passed through the wiring duct.

Although not illustrated, the container type power storage system 80 may include a DC input and output board that has a function of collecting outputs of all the batteries and supplying power to a host system.

The strings ST1 to ST20 have a plurality of battery modules 2 stacked, and are divided and arranged in parallel in a longitudinal direction of the container 81. The strings ST11 to ST20 are provided in the back in FIG. 7, and the strings ST1 to ST10 are provided in the front. One string ST is configured by storing a battery management unit BMU 6 and 16 (2 rows×8 stages) battery modules in the metal battery rack 23. The plurality of battery racks 23 is disposed so as to be mechanically connectable. The battery modules 2 of each string ST are placed on a shelf plate of each battery rack 23, and a grounding position of the battery modules is electrically connected to the shelf plate.

The battery modules 2 housed in each string ST are connected in series to each other, and a positive terminal and a negative terminal of the series connection are connected to the battery management unit BMU 6. The battery management unit BMU 6 is connected to the branch board 22 via the connection wiring (power wiring part) 43.

Further, communication terminals of the battery modules 2 sequentially connect the respective battery modules, and are finally connected to communication terminals of the battery management unit BMU 6. The battery management units BMU 6 are sequentially connected to each other by communication and connected to the HUB that is an information collection device, which can collect data and the like of all modules.

Further, the container 81 includes a switchboard 82 that distributes AC power to be used in the container 81, a branch board 22, a first frame on which the battery board is placed, and a second frame on which the branch board 22 is placed. In the first frame and the second frame, a plurality of connection wiring cables and a plurality of communication cables that are disposed in the floor structure of the container 81 and connect the battery board and the branch board 22 are stored and wired.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power storage system comprising:
a battery board including a lithium secondary battery;
a branch board including an information collection device;
a first frame on which the battery board is placed;
a second frame on which the branch board is placed; and
a plurality of connection wirings that are disposed in the first frame and, the second frame and connect the battery board and the branch board,
wherein the plurality of connection wirings are, aggregated in the second frame, and
wherein the battery board includes a battery management unit electrically connected to the lithium secondary battery, and the battery management unit is connected to the information collection device.

2. The power storage system according to claim 1, wherein the battery board, the first frame, and the second frame are covered with a heat resistant member.

3. The power storage system according to claim 1, wherein an insulating member is disposed between the branch board and the second frame.

4. The power storage system according to claim 1, wherein each of the plurality of connection wirings has a resistance value that varies depending on a distance between the battery board and the branch board.

5. The power storage system according to claim 4, wherein each of the connection wirings has a resistance value that increases as the distance between the battery board and the branch board decreases.

6. The power storage system according to claim 4, wherein each of the connection wirings has a smaller cross-sectional area of the conductor as the distance between the battery board and the branch board decreases.

7. The power storage system according to claim 1, wherein each of the connection wirings has a cross-sectional area of a conductor that varies depending on the distance between the battery board and the branch board.

8. The power storage system according to claim 1, wherein the branch board includes a circuit breaker that corresponds to the plurality of battery boards, an input and output terminal that inputs and outputs electric power, and an internal connection wiring that connects the circuit breaker and the input and output terminal, and
the internal connection wiring has a length adjusted based on a length of the connection wiring between the battery board and the branch board.

9. The power storage system according to claim 8, wherein the length of the internal connection wiring is calculated using Equation 1 from the length of the connection wiring and a resistance value per unit length of the connection wiring:

$$(Ln \times Rn) + (ln \times rn) = Z \quad \text{(Equation 1)}$$

wherein n represents a number of the battery board,
Ln represents the length of the connection wiring,
Rn represents the resistance value per unit length of the connection wiring, ln represents the length of the internal connection wiring, m represents the resistance value per unit length of the internal connection wiring, and Z represents a combined resistance value of the connection wiring and the internal connection wiring.

10. The power storage system according to claim 1, wherein the first frame includes a first relay terminal, and
an output line from the battery management unit is connected to the branch board via the first relay terminal.

11. The power storage system according to claim 10, wherein the second frame includes a second relay terminal.

12. The power storage system according to claim 1, wherein the information collection device collects information from the battery board.

13. A container type power storage system comprising:
a power storage device including:
- a branch board including an information collection device;
- a battery board including a lithium secondary battery and a battery management unit electrically connected to the lithium secondary battery, wherein the battery management unit is connected to the information collection device;
- a first frame on which the battery board is placed;
- a second frame on which the branch board is placed; and
- a plurality of connection wirings that are disposed in the first frame and the second frame and connect the battery board and the branch board, the plurality of connection wirings being aggregated in the second frame; and a container configured to accommodate the power storage device.

* * * * *